United States Patent [19]

Rodi

[11] Patent Number: 4,788,479
[45] Date of Patent: Nov. 29, 1988

[54] CONTROL MECHANISM FOR A SEPARATELY EXCITED DC DRIVE MOTOR AND METHOD FOR CONTROL OF A DC DRIVE MOTOR

[75] Inventor: Anton Rodi, Leimen, Fed. Rep. of Germany

[73] Assignee: Druckmaschinen AG Heidelberger, Heidelberg, Fed. Rep. of Germany

[21] Appl. No.: 934,307

[22] Filed: Nov. 24, 1986

[30] Foreign Application Priority Data

Nov. 22, 1985 [DE] Fed. Rep. of Germany ....... 3541276

[51] Int. Cl.[4] .............................................. H02P 7/28
[52] U.S. Cl. .................................. 318/350; 318/338; 318/341; 318/317; 318/329; 318/439
[58] Field of Search ............... 318/434, 450, 314, 317, 318/316, 318, 326, 327, 328, 331, 332, 333, 334, 338, 341, 345, 599, 601, 603, 605, 607, 608, 350, 311, 432, 433, 436, 438, 685; 400/283, 310, 317, 317.1, 902, 903, 320, 322

[56] References Cited

U.S. PATENT DOCUMENTS

| | | | |
|---|---|---|---|
| 3,577,057 | 5/1971 | Dyer | 318/329 X |
| 3,947,738 | 3/1976 | Oliver | 318/345 X |
| 3,950,684 | 4/1976 | Peterson | 318/338 |
| 4,019,107 | 4/1977 | Dixon et al. | 318/338 |
| 4,107,595 | 8/1978 | Campe | 318/696 |
| 4,226,546 | 10/1980 | Hoffman | 318/603 X |
| 4,284,932 | 8/1981 | Kawada et al. | 318/338 |
| 4,368,411 | 1/1983 | Kidd | 318/599 X |
| 4,378,517 | 3/1983 | Morton et al. | 318/319 X |
| 4,399,892 | 8/1983 | Watanabe | 187/29 R |
| 4,476,417 | 10/1984 | Zimmermann | 318/311 X |
| 4,484,117 | 11/1984 | Bose | 318/338 |
| 4,525,657 | 6/1985 | Nakase et al. | 318/313 X |
| 4,544,868 | 10/1985 | Murty | 318/254 |
| 4,549,122 | 10/1985 | Berkopec et al. | 318/338 |
| 4,578,626 | 3/1986 | Richter | 318/317 X |
| 4,583,028 | 4/1986 | Angersbach et al. | 318/439 X |
| 4,648,003 | 3/1987 | Braitinger et al. | 318/318 X |
| 4,649,328 | 3/1987 | Leonard et al. | 318/341 X |

FOREIGN PATENT DOCUMENTS

0200713 12/1986 European Pat. Off. .
2074404 10/1981 United Kingdom .

OTHER PUBLICATIONS

IEE Proc., vol. 130, Part B, Mar. 1983, pp. 143–147; B. A. White et al.: "A Simple Digital Control Scheme for a DC Motor".

*Primary Examiner*—William M. Shoop, Jr.
*Assistant Examiner*—Paul Ip
*Attorney, Agent, or Firm*—Herbert L. Lerner; Laurence A. Greenberg

[57] ABSTRACT

In combination, a control mechanism for a separately excited DC drive motor, and a device for generating an exciter current to be supplied to a field winding of the motor, includes a measuring device for measuring operational values of the motor, and a device connected to the measuring device for adjusting the exciter current, in accordance with measurement results of the measured values, to a determined value at which a preselected operational characteristic exists, and the exciter current is kept constant at the determined value.

11 Claims, 1 Drawing Sheet

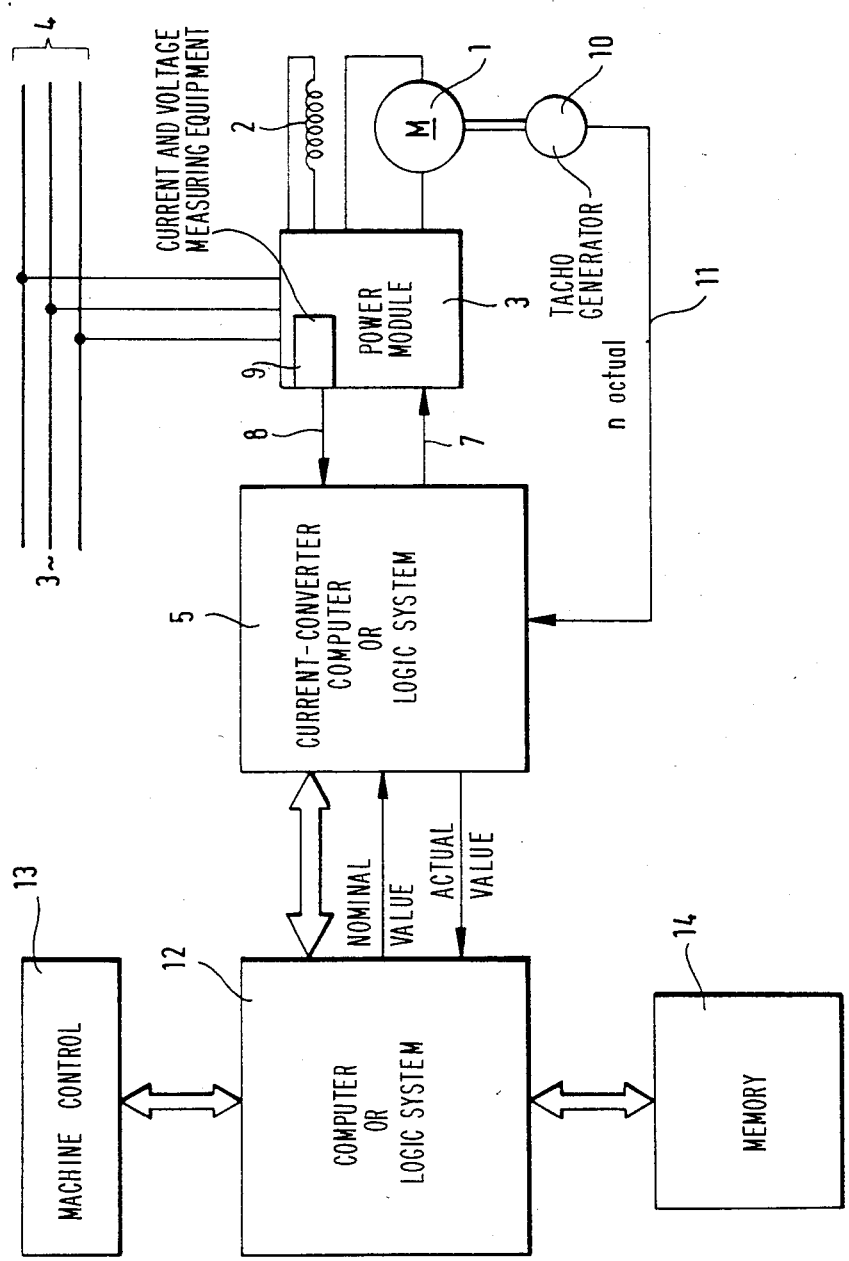

CONTROL MECHANISM FOR A SEPARATELY EXCITED DC DRIVE MOTOR AND METHOD FOR CONTROL OF A DC DRIVE MOTOR

The invention relates to a control mechanism for a separately excited DC drive motor, for example, for a printing press or the like in combination with a device for generating an exciter current to be supplied to a field winding of the motor.

The speed of such motors is set by suitable selection of the armature voltage, precise adherence to a speed prescribed from a control panel being necessary especially in the case of printing presses, preferably offset printing presses. The technical data of mass-produced motors differ due to manufacturing and material tolerances. Because of these tolerances, which cause deviations in various machine constants, the exciter current must be adjusted from machine to machine in such a way that a defined ratio between armature voltage and rotary speed is obtained, in order that speed control via the armature voltage can operate with a defined operating point. In addition to the aforementioned tolerances, temperature-dependent and load-dependent changes may occur in the machine constants.

Motors of the aforedescribed type are generally supplied from an AC system, especially from a three-phase system, by means of controlled-current rectifiers, and controlled power inverters are also installed in case of regenerative braking, these inverters ensuring the return of electrical energy to the system. However, the invention is not limited thereto.

It has become known heretofore, for example for compensating for the aforementioned tolerances in the case wherein a given motor is combined with a given control mechanism, to adjust the exciter current and thus the exciter field by setting sequences performed manually; such adjustment is difficult and requires qualified technical personnel. This leads, on the one hand, to delays in the attainment of an operational condition in a plant, and causes high costs on the other hand. If it becomes necessary to exchange the drive motor or control mechanism, and especially the components in the control mechanism supplying the exciter current, the aforementioned setting sequences must again be performed by the technical personnel. A method is also known in which a constant current is impressed upon the exciter winding, and the aforementioned tolerances are compensated for by suitably varying the armature voltage, i.e. by stabilizing or controlling the armature current or power circuit. This causes the rotary speed range of the motor, which can be traversed or covered by varying the armature voltage, to deviate from the setpoint range. In particular, the required maximum speed can no longer be achieved at maximum rectifier output voltage when the excitation is too intense. It is, indeed, possible to avoid this if the motor is constructed for a lower rated voltage, but it is then necessary to make the motor larger.

It is accordingly an object of the invention to provide a combination of an exciter current generating device and a control mechanism of the type initially mentioned herein which will ensure a defined operating performance or characteristic of the motor without the aforementioned disadvantages and without requiring precise manual matching or adjustment to a motor.

With the foregoing and other objects in view, there is provided, in accordance with the invention, in combination, a control mechanism for a separately excited DC drive motor, and a device for generating an exciter current to be supplied to a field winding of the motor, comprising a logic or computer unit and/or an adjustment device, and, linked thereto, a measuring unit, for measuring operating data or values from the motor, the current converter being constructed in such a way that the exciter current is adjusted in accordance with the measured data obtained regarding operating variables to such a value ("determined value") that a preselected operating performance or characteristic, e.g. a preselected ratio of armature voltage to rotary speed (at a prescribed load) or between armature voltage and torque is obtained, and the exciter current is further maintained at the determined value.

An advantage of the invention is that the exciter current can be correctly set without complicated setting or adjusting work which would have to be performed by specialists. The invention thus makes it possible to obtain a required operating performance or characteristic for the drive and for the entire unit without complicated setting or adjusting work which would have to be performed by specialists. Also, compensation for tolerances of the exciter circuit in the armature current or power circuit is unnecessary. The arrangement can be constructed in such a way that the control mechanism sets the exciter current to the determined value completely automatically. In order for the control mechanism to be able to perform this setting sequence automatically, the control mechanism must contain stored data regarding the required operating performance; in the interest of simplicity, only the ratio between armature voltage and speed is dealt with hereinafter. Provided all the motors produced by any particular manufacturer and capable, based upon their power requirements, of being combined with a particular control mechanism have the same ratio between armature voltage and speed, this control mechanism can be combined with all of these motors without any further intervention and will then set the exciter current required in each case automatically. Where motors differing with regard to armature voltage/speed ratio can be combined with one and the same control mechanism, assurance must be provided that the control mechanism contains the data for the motor type which is actually to be connected. For this purpose, the data can be stored in a digital memory which can be used in a plug-in base of the control mechanism even by non-specialists.

A method is known in which an exciter current is of such a magnitude that the magnetic exciter circuit is in a state of saturation. Permeation deviations then have less effect. However, it is then necessary to accept increased power losses and heating.

In contrast therewith there is also provided in accordance with another feature of the invention for the motor to operate in a range of the magnetization curve located outside the saturation range, that is to say, in a range of relatively great steepness of the magnetization curve. An increase in exciter current then causes an increase in flux. Under constant armature current, motor torque is proportional to flux. This makes possible another construction of the invention in which exciter current is increased above the determined value in order to provide a brief increase in motor torque. Such an increase in torque may be desirable or necessary at the moment of motor start-up, namely at the so-called "breakaway" point for the motor and the printing press connected thereto.

In accordance with a further feature of the invention, the control mechanism is constructed in such a way that exciter current is decreased below the determined value in the case of a drop in mains voltage. The advantage is that assurance can then be provided that the maximum voltage which can be generated for feeding the armature is always greater by a preselected value or more than the armature voltage actually required. Control and adjustment of speed as well as an increase in speed, can thus be achieved with assurance at any time by means of an increase in armature voltage. It should be noted, however, that torque and produced power decrease if exciter current reduces and armature voltage is kept constant.

In order for the control mechanism to be able to maintain the exciter current at the determined value and be capable of reestablishing this value with certainty even after the modification or variation of the exciter current for the purpose of modifying or varying the torque as just described or, in the case of changes in mains voltage, an embodiment of the invention provides for the inclusion in the control mechanism of a memory for storage of the determined value for the exciter current.

Also considered as belonging to the invention is a method for control of a drive motor for a printing press or the like, in which the armature voltage is modified or varied in order to affect the rotary speed, in a manner which is already long known, and in which in accordance with the invention, the exciter current, which is normally kept constant, is modified or varied in order to influence motor operational performance or characteristics.

Certain possible methods by which the control mechanism can be made capable of determining the exciter current to be set are described hereinafter.

Other features of the invention which are considered as characteristic are set forth in the appended claims.

Although the invention is illustrated and described herein as embodied in a control mechanism for a separately excited DC drive motor and method for control of a DC drive motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a schematic view in the form of a block diagram of a control mechanism for a sheet-fed offset printing press.

Referring now to the drawing, there is shown a separately excited DC motor 1 which, in this case, drives a six-color sheet-fed offset printing press. An armature current for the motor 1 and an exciter current fed to a field winding 2 of the motor 1 are supplied by a power module 3, which contains non-illustrated controlled current rectifiers (thyristors), which convert electrical energy supplied from a three-phase supply or network 4 to direct current. During braking operation of the motor 1, electrical energy can be returned to the supply or network 4 via the power module 3. Ignition pulses for the power module 3 are generated by a current-converter logic or computer 5 and routed to the power module 3 via lines 7. The power module 3 contains current measuring equipment 9 and voltage measuring equipment, from which measured data are routed via lines 8 to the current-converter logic or computer unit 5. A tachogenerator 10 connected to the shaft of the motor 1 supplies a signal characteristic for the rotary speed of the motor 1 via a line 11 to the current-converter logic or computer unit 5.

A logic or computer unit 12 coupled to the current-converter or computer unit 5 is connected to a machine control unit 13 and a memory 14. The machine control unit 13 is actuated by the printer responsible for the printing press and is of conventional construction; the printer can, for example, switch on and switch off the printing press therewith and can set the speed thereat. Other setting procedures and adjustments not having any direct relationship with the drive of the motor 1, for example adjustment of the printing press register, can also be performed in the machine control unit 13.

Parameters for the motor 1 used for driving the printing press and for the printing press per se in the arrangement shown in the FIGURE are stored in the memory 14. These parameters include, in particular, maximum permissible armature current, maximum permissible armature voltage, and initial setpoint or nominal value for the exciter current for the field winding 2, permissible rotary speed range of the motor 1, and, where necessary or appropriate, other values.

Due to the tolerances mentioned in the introduction hereto, the motor 1, at initial start-up of the unit after its installation, will not immediately assume the precise predetermined speed for which the corresponding armature voltage is supplied to it from the power module 3 when the exciter current is set to the initial (preliminary) setpoint or nominal value stored in the memory 14, but rather, the actual speed will instead be either higher or lower. The logic system or computer unit 12 contains a program which varies exciter current while maintaining constant armature voltage until the required speed is attained. The value of the exciter current at which this speed is achieved is then stored by the logic or computer unit 12 in the memory 14, and, moreover, the fact that this stored exciter current is not the originally stored preliminary setpoint or nominal value for the exciter current, but is instead an exciter current corrected on the basis of more precise measurement is also stored therein. When the unit is switched on the next time, no new determination of the exciter current is performed again, because it is already precisely known. Due to the fact that the exciter current is adjusted automatically to the required value in the manner just described, the logic system or computer 12 simultaneously fullfil the function of a control unit. It is also possible to redetermine the exciter current after each sequence of switching on the unit.

Where necessary, the voltage drop in the armature windings and the armature reaction can be taken into account.

There are also other possible ways of establishing the exciter current necessary for obtaining a predetermined operational performance for the motor 1. For example, the preliminary setpoint or nominal value $i_{Fo}$ for the exciter current and the rated armature voltage $u_{Ao}$ can initially be set. A rotary speed $n_i$ then results, which will normally deviate from the required rated speed $n_o$ and which must therefore subsequently be adjusted to the rated speed by modifying or varying the armature voltage. The armature voltage then has the value $u_{Ai}$. The exciter current $i_{Fi}$ which is actually required can be approximated as follows:

$$i_{Fi} \approx \frac{u_{Ai} \times i_{Fo}}{u_{Ao}}.$$

In another possible method, the armature voltage is modified or varied at a given initial setpoint or nominal value $i_{Fo}$ for the exciter current and at a measured armature voltage $u_{Ai}$ at the setpoint or nominal rotary speed $n_o$, until the armature voltage assumes the rated value $u_{Ao}$. The rotary speed $n_i$ is thus obtained. The ratio $n_o/n_i$ multiplied by the initial setpoint or nominal value $i_{Fo}$ for the exciter current likewise produces the actually required exciter current $i_{Fi}$.

The actually-required exciter current which is determined in the aforedescribed manner is stored in the memory 14, as mentioned hereinbefore, and is therefore continuously available.

Increased torque is required at start-up of the unit from stand-still, i.e. the so-called "breakaway" point. If this increased torque is not required to be produced by means of an increased armature current, the exciter current can be increased briefly and, after "breakaway", again reduced to the value stored in the memory 14.

The aforedescribed methods of determining the exciter current actually required should preferably be performed automatically, as described, with the use of a readily available program contained in the logic or computer unit.

The foregoing is a description in substance of German Application No. P 35 41 276.3, dated Nov. 22, 1985, the International priority of which is being claimed for the instant application, and which is hereby made part of this application. Any material discrepancies between the foregoing specification and the aforementioned German Application are to be resolved in favor of the latter.

I claim:

1. In combination, a control mechanism for a separately excited DC drive motor being operated under given current and voltage conditions, and a device for generating an exciter current to be supplied to a field winding of the motor, comprising a measuring device for measuring said operating current and voltage conditions; current adjusting means connected to said measuring device for adjusting the exciter current, in response to the measured motor operating current and voltage conditions, to a determined value such that at least one of a preselected ratio of armature voltage to rotary speed and a preselected ratio of armature voltage to torque is attained; and means for maintaining the exciter current constant at said determined value.

2. The combination according to claim 1, wherein said current adjusting means are at least one of a computer and a current converter.

3. The combination according to claim 1, wherein said preselected operational characteristic existing at said determined value of the exciter current adjusted by said adjusting means is a preselected ratio of armature voltage to rotary speed of the motor at a prescribed load.

4. The combination according to claim 1, wherein said preselected operational characteristic existing at said determined value of the exciter current adjusted by said adjusting means is a preselected ratio of armature current to torque of the motor.

5. The combination according to claim 1, including further current adjusting means for adjusting the exciter current to a value at which a magnetic flux resulting from the exciter current is below saturation range of a magnetization curve for the field winding.

6. The combination according to claim 1, including further current adjusting means for decreasing the exciter current below said determined value for briefly increasing the torque of the motor.

7. The combination according to claim 1, including further current adjusting means for decreasing the exciter current below said determined value upon a drop in mains voltage.

8. The combination according to claim 1, including a memory for storing the determined value of the exciter current.

9. Control mechanism for a DC drive motor having given tolerances, according to claim 1, including memory means for storing operational data, connected to said current adjusting means for compensating said given motor tolerances.

10. Method for operating a separately excited DC drive motor having a field winding and an operational characteristic including at least one of a preselected ratio of armature voltage to rotary speed and a preselected ratio of armature voltage to torque, and a current converter and logic system for controlling the armature voltage and exciter current value comprising the steps of: controlling the rotary speed of the motor by controlling the armature voltage; varying the exciter current value so as to select the operational characteristic of the motor, and subsequently maintaining the exciter current at said exciter current value.

11. Method according to claim 10 wherein said drive motor has given tolerances, comprising the step of reading motor control data from a data memory connected to said current converter for compensating for tolerances in said motor.

* * * * *

UNITED STATES PATENT AND TRADEMARK OFFICE
CERTIFICATE OF CORRECTION

PATENT NO. : 4,788,479

DATED : November 29, 1988

INVENTOR(S) : Anton Rodi

It is certified that error appears in the above-identified patent and that said Letters Patent is hereby corrected as shown below:

On the title page item [73], "Druckmaschinen AG Heidelberger," should read --Heidelberger Druckmaschinen AG,--.

Signed and Sealed this

Seventh Day of August, 1990

Attest:

HARRY F. MANBECK, JR.

*Attesting Officer*  *Commissioner of Patents and Trademarks*